United States Patent [19]

Hinrichs et al.

[11] Patent Number: 4,767,453
[45] Date of Patent: Aug. 30, 1988

[54] PROCESS FOR CREATING THE FLOW PROPERTIES TO SODIUM-PRODUCTION FILTER RESIDUES

[75] Inventors: Walter Hinrichs, Bruehl; Herbert Hovestadt, Erftstadt; Ludwig Lange, Bruehl; Kurt A. Ruppert, Langenselbold; Erich Splett, Huerth-Berrenrath, all of Fed. Rep. of Germany

[73] Assignee: Degussa Aktiengesellschaft, Frankfurt, Fed. Rep. of Germany

[21] Appl. No.: 144,347

[22] Filed: Jan. 15, 1988

[30] Foreign Application Priority Data

Jan. 24, 1987 [DE] Fed. Rep. of Germany ....... 3702053

[51] Int. Cl.$^4$ .................. C22B 26/10; C25C 3/06; C21C 7/00; C21B 3/04
[52] U.S. Cl. ........................... 75/66; 75/67 R; 75/93 R; 204/68; 204/69; 266/227; 266/233; 423/659
[58] Field of Search ............... 423/659; 75/66, 67 R, 75/67 A, 93 R; 204/68, 69; 266/201, 227, 223

[56] References Cited

U.S. PATENT DOCUMENTS

| | | | |
|---|---|---|---|
| 1,943,307 | 1/1934 | Gilbert | 75/66 |
| 2,960,397 | 11/1960 | Cobel | 266/227 |
| 3,015,190 | 1/1962 | Arbeit | 266/233 |
| 3,463,721 | 8/1966 | Harris | 204/68 |
| 3,497,447 | 2/1970 | Berry | 204/68 |
| 3,523,885 | 8/1970 | Gallinger | 204/68 |
| 3,703,340 | 11/1972 | Salmon et al. | 266/233 |
| 4,154,607 | 5/1979 | Wikman et al. | 204/68 |
| 4,328,958 | 5/1982 | Dolzhenkoo | 266/233 |
| 4,494,985 | 1/1985 | Bulter et al. | 266/227 |

Primary Examiner—Gary P. Straub
Attorney, Agent, or Firm—Beveridge, DeGrandi & Weilacher

[57] ABSTRACT

A process is described for creating the flow properties to filtration residues from sodium production. These viscous-to-hard filter residues can be changed into a thin-fluid consistency by intensively agitating them under an inert gas for 2-6 hours at temperatures between 300° and 600° C.

2 Claims, No Drawings

PROCESS FOR CREATING THE FLOW PROPERTIES TO SODIUM-PRODUCTION FILTER RESIDUES

INTRODUCTION AND BACKGROUND

The present invention relates to a process for converting filtration residues of crude sodium obtained by fusion electrolysis methods and of viscous-to-hard consistency at temperatures above the sodium melting point into a material of thin consistency.

The sodium produced by fusion electrolysis at about 600° C., namely the so-called crude sodium, contains about 2% contamination. In addition to slight amounts of entrained crucible melt ($BaCl_2$, $CaCl_2$, $NaCl$) and oxides, hydroxides as well as carbonates of sodium and calcium, metallic calcium is primarily present, which during cooling to a temperature of about 120° C. will extensively segregate and which together with the other impurities will be filtered and separated out by a steel wire mesh filter at that temperature.

The calcium content of the sodium purified in this manner to obtain the so-called standard grade of sodium as a rule is 300–600 ppm, whereas the oxide and chloride content each will be less than 10 ppm. The filter residue, the so-called filter sludge, on the other hand contains a calcium content of about 15–21% by weight, on the average about 17% by weight.

As the impurities of the above-mentioned filter residues increase, the filter sludge becomes viscous-to-hard at temperatures about the sodium melting point and therefore presents handling problems. Illustratively, the sludge to be removed from the filter equipment had to be moved to a conveyor screw mounted at the bottom of this filter equipment, and heretofore this has been possible only by employing substantial manual effort. No pumping, pressure conveyor or suction equipment could be used to convey the residue for purposes of processing; instead any shipping of such materials had to be carried out in containers filled and emptied manually by shovel.

SUMMARY OF THE INVENTION

In accordance with the present invention, there is provided a method for treating the filtration residues of crude sodium obtained by fusion electrolysis in order to obtain a product of thin-fluid consistency at temperatures above the sodium melting point. The process is carried out by agitating the crude sodium filter residues intensively in an inert atmosphere for 2–6 hours at temperatures in the range of 300°–600° C.

DETAILED DESCRIPTION OF THE INVENTION

The process of the present invention brings about an advantage such that even at temperatures only slightly above the sodium melting point (about 10°–30° C. above it), the handling characteristics of the liquids is improved. For example, the filter sludge can be aspirated, siphoned, and pumped over large distances. Material once treated in accordance with the process of the invention, even after solidifying can be liquefied again by simply heating above the melting point of sodium. The liquefied state of the filter sludge treated in accordance with the invention resembles that of molten pure sodium.

Further details of the invention are shown below by means of several examples.

Four filter sludges with total calcium contents of
17.7% by weight: Example 1
15.6% by weight: Example 2
19.2% by weight: Example 3
18.0% by weight: Example 4
were liquefied in the manner of the invention. The heating times and temperatures were as follows:

| Example | time (h) | temp. (°C.) |
|---------|----------|-------------|
| 1 | 4 | 500 |
| 2 | 6 | 300 |
| 3 | 2 | 600 |
| 4 | 4 | 550. |

In every test example and for the conditions stated, at temperatures of 100°–130° C. approximately, a thin-fluid, pumpable and pressure-conveyable material was obtained from an initial viscous-to-hard material. Any inert atmosphere suitable for purposes of the invention can be used. Typically, nitrogen can be used. Ordinary mixing and agitation equipment can be used for purposes of the present invention. Typically, the stirring element of the agitator is a raking or sweeping device for raking the container's walls and bottom, thereby scrapping off any filtration residue of crude sodium which may adhere to the walls or bottom of the agitation vessel.

Crude sodium is filtered by a filter element which is installed in the middle of a filter tank of conventional design. This assembly constitutes the filtering apparatus. After the filtering step, the filtration residue is scrapped off the filter element and the filter element is then drawn out of the filter tank. Thereafter, heating and stirring is carried out with respect to the residue remaining in the tank.

The liquefaction process of the present invention allows substantial simplification of the removal of filter residues from sodium filtration apparatus because the temperature treatment already can be carried out in the filter. Therefore, no special equipment is required for the present invention.

Further variations and modifications of the present invention will be apparent from the foregoing and are intended to be encompassed by the claims appended hereto.

German priority application P 37 02 053.6-24 is relied on and incorporated by reference.

We claim:

1. A process for converting filtration residues from the filtration of crude sodium obtained by fusion electrolysis, which are viscous-to-hard at temperatures above the melting point of sodium into a material of thin-fluid consistency, comprising subjecting crude sodium filtration residues to agitation under an inert gas for 2–6 hours at temperatures in the range of 300°–600° C., and recovering the sodium containing residues of improved consistency.

2. A process for recovering sodium filtration residue of a thin-fluid consistency from crude sodium filtration residue of viscous-to-hard characteristics comprising carrying out fusion electrolysis to obtain a crude sodium, cooling said crude sodium and filtering to obtain a crude sodium filter cake, heating said filter cake to a temperature of 300° to 600° C. for 2 to 6 hours under an inert atmosphere while agitating the heated crude sodium filter cake and recovering the sodium filter cake of thin-fluid consistency capable of being pumped.

* * * * *